US007284116B2

(12) United States Patent
Jourdan et al.

(10) Patent No.: US 7,284,116 B2
(45) Date of Patent: Oct. 16, 2007

(54) METHOD AND SYSTEM FOR SAFE DATA DEPENDENCY COLLAPSING BASED ON CONTROL-FLOW SPECULATION

(75) Inventors: Stephan J. Jourdan, Portland, OR (US); Freddy Gabbay, Tel-Aviv (IL); Ronny Ronen, Haifa (IL); Adi Yoaz, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 378 days.

(21) Appl. No.: 10/307,557

(22) Filed: Dec. 2, 2002

(65) Prior Publication Data
US 2003/0154362 A1    Aug. 14, 2003

(51) Int. Cl.
*G06F 9/34* (2006.01)
(52) U.S. Cl. ...................... 712/216; 712/233
(58) Field of Classification Search ............... 712/216, 712/239, 217, 233
See application file for complete search history.

(56) References Cited

U.S. PATENT DOCUMENTS

| 5,197,132 | A | * | 3/1993 | Steely et al. ................ 712/217 |
| 5,452,426 | A | * | 9/1995 | Papworth et al. ............ 712/217 |
| 5,784,604 | A | * | 7/1998 | Muhich et al. ............. 712/238 |
| 5,819,057 | A | * | 10/1998 | Witt et al. .................. 712/204 |
| 5,835,744 | A | * | 11/1998 | Tran et al. .................. 712/208 |
| 5,919,256 | A | * | 7/1999 | Widigen et al. ............ 712/218 |
| 6,000,028 | A | * | 12/1999 | Chernoff et al. ............ 712/226 |
| 6,079,006 | A | * | 6/2000 | Pickett ....................... 711/213 |
| 6,223,254 | B1 | * | 4/2001 | Soni .......................... 711/125 |
| 6,260,190 | B1 | * | 7/2001 | Ju .............................. 717/156 |
| 6,408,383 | B1 | * | 6/2002 | Tremblay et al. .......... 712/227 |

FOREIGN PATENT DOCUMENTS

WO        WO 96/12228    * 4/1996

* cited by examiner

*Primary Examiner*—Eric Coleman
(74) *Attorney, Agent, or Firm*—Kenyon & Kenyon LLP

(57) ABSTRACT

The present invention is directed to an apparatus and method for data collapsing based on control-flow speculation (conditional branch predictions). Because conditional branch outcomes are resolved based on actual data values, the conditional branch prediction provides potentially valuable insight into data values. Upon encountering a branch if equal instruction and this instruction is predicted as taken or a branch if not equal instruction and this instruction is predicted as not taken, this invention assumes that the two operands used to determine the conditional branch are equal. The data predictions are safe because a data misprediction means a conditional branch misprediction which results in a pipeline flush of the instructions following the conditional branch instruction including the data mispredictions.

27 Claims, 13 Drawing Sheets

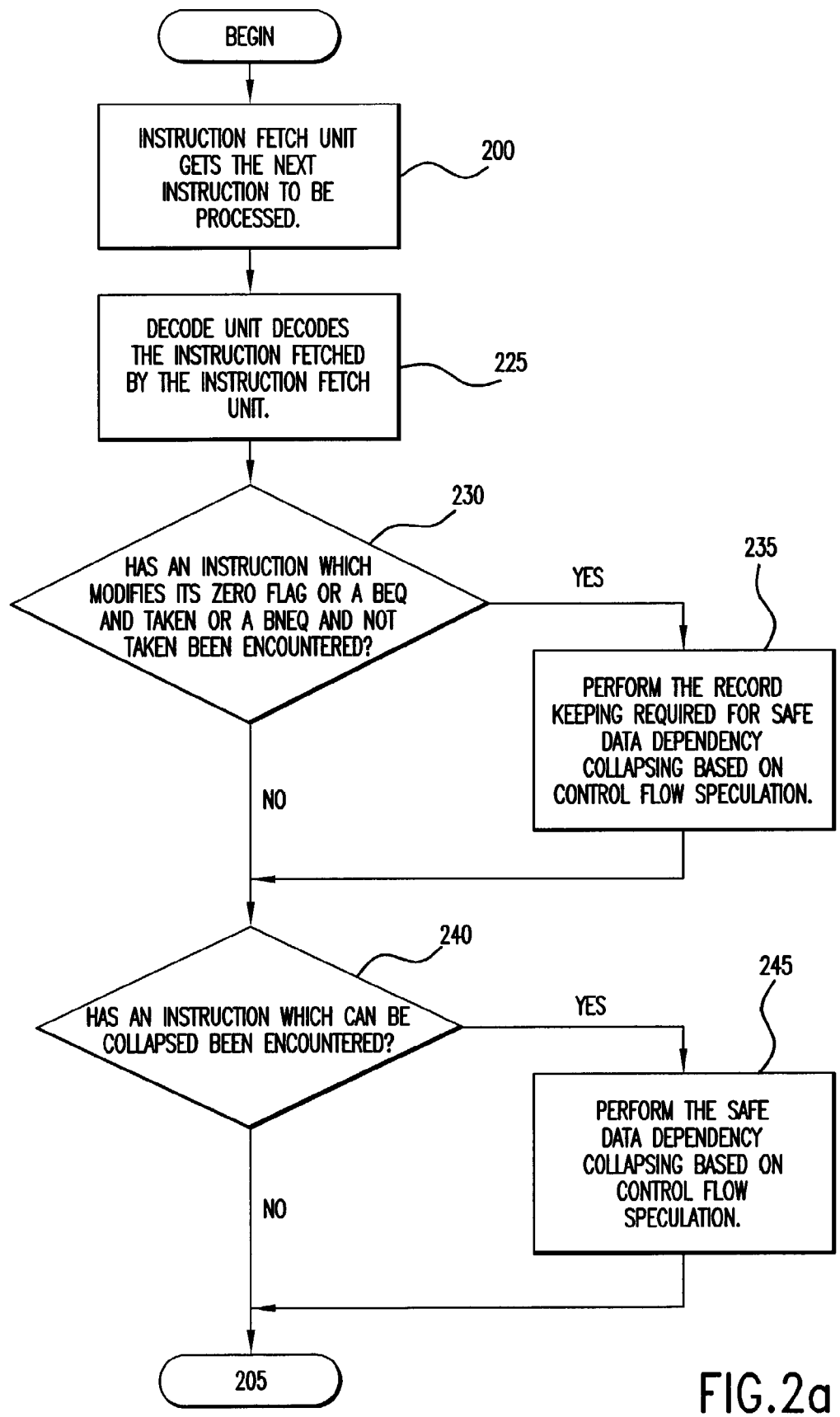

METHOD AND SYSTEM FOR SAFE DATA DEPENDENCY COLLAPSING BASED ON CONTROL-FLOW SPECULATION

BACKGROUND OF THE INVENTION

I. Field of the Invention

This invention relates generally to computer technology, and more particularly, to improving processor performance in a computer system.

II. Background Information

Processors execute a series of program instructions. Some processors achieve high performance by executing multiple instructions per clock cycle. The term "clock cycle" refers to an interval of time accorded to various stages of an instruction processing pipeline within the processor. The term "instruction processing pipeline" refers to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

A branch instruction is an instruction which typically causes subsequent instructions to be fetched from one of at least two addresses: a sequential address identifying an instruction stream beginning with instructions which directly follow the branch instruction; and a target address identifying an instruction stream beginning at another location in memory. When it is known whether or not an instruction being processed in the pipeline will cause a branch, and to what address the instruction will cause a branch, the branch is resolved. Branch instructions typically are not resolved until after the execution stage. Waiting for the branch instruction to be resolved would starve the pipeline and severely impact performance because it is unknown which instructions to load into the pipeline until after the branch is resolved. In order to maintain optimum performance of the processor, it is necessary to predict the instruction subsequent in program order to the control-flow instruction and dispatch that instruction into the instruction processing pipeline.

A branch prediction mechanism indicates a predicted direction (taken or not-taken) for a branch instruction, allowing subsequent instruction fetching to continue within the predicted instruction stream indicated by the branch prediction. In this way, branch prediction allows program execution to be done in greater parallel. When using branch prediction, instructions from the predicted instruction stream may be placed into the instruction processing pipeline prior to execution of the branch instruction.

Branch prediction allows for greater processor performance (and thus greater computer system performance) by preventing the pipeline from being idle until the branch is resolved. That is, branch prediction allows for instructions to be fetched, decoded, and executed in the direction of a predicted instruction stream even before the branch is resolved thus preventing the processor from being idle until the branch is resolved. If the predicted instruction stream is correct, then the number of instructions executed per clock cycle is advantageously increased. However, if the predicted instruction stream is incorrect (i.e. one or more branch instructions are predicted incorrectly), then the instructions from the incorrectly predicted instruction stream are discarded from the instruction processing pipeline and the number of instructions executed per clock cycle is decreased.

Well known techniques for branch prediction exist. Some use static information, such as the direction and the distance of the branch, others use run time information which consists of prior history as to whether branches were taken or not to predict whether or not future branches will be taken.

As described earlier, branch prediction is one way to improve processor performance. Another technique for improving processor performance is data speculation. Data speculation, among other things, addresses the problem of the growing gap between main memory and processor clock speeds. As a result of this gap, computer system performance is increasingly dominated by the latency of servicing memory accesses, particularly those accesses which are not easily predicted by the temporal and spatial locality captured by conventional cache memory organizations. Temporal locality describes the likelihood that a recently-referenced address will be referenced again soon, while spatial locality describes the likelihood that a close neighbor of a recently-referenced address will be referenced soon. If data can be correctly predicted then the processor is spared the time required for memory access (i.e., access to the cache, main memory, disk drive, etc.) in order to get that data.

Current data speculation methods include load value prediction where the results of loads are predicted at dispatch by exploiting the affinity between load instruction addresses and the data the loads produce. This method takes advantage of the fact that memory loads in many programs demonstrate a significant degree of data locality.

Branch prediction gives us insights into data values so that data speculation can be efficiently performed. Further, this data speculation is "safe" because a branch misprediction causes the pipeline to be flushed thus discarding all the instructions involved in the incorrect data speculation. The problem with current methods of data speculation, however, is that they do not exploit the insights provided by branch prediction in order to increase processor performance.

For the foregoing reasons, data dependency collapsing based on control-flow speculation can enhance processor performance.

SUMMARY OF THE INVENTION

The present invention is directed to an apparatus and method for collapsing one or more operands. An embodiment of the present invention includes a post-decode unit which upon decoding an instruction that modifies its zero flag when executed, records information in a first entry about the operands for that particular instruction. Upon decoding an instruction that is either a branch if equal instruction and predicted as taken or a branch if not equal instruction and predicted as not taken, the post-decode unit copies the recorded information in the first entry to one of the second entries. The post-decode unit also translates the operands of an instruction if information is recorded about the operands in one of the second entries and that recorded information is valid.

DETAILED DESCRIPTION

I. Overview

Figure 1A:
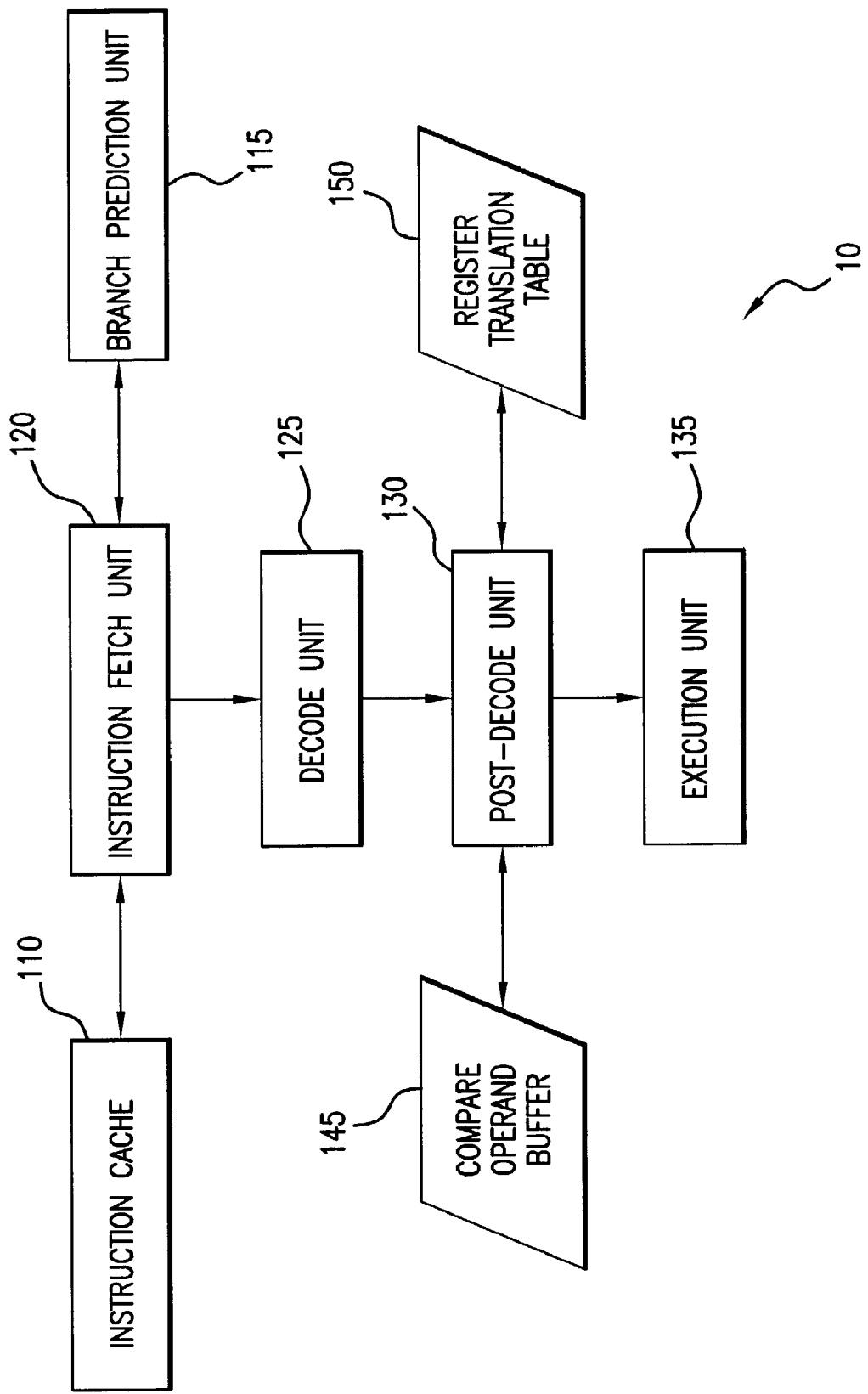
FIG. 1a is a block diagram illustrating the hardware involved in one embodiment of the present invention.

The present invention uses control-flow speculation to perform safe data dependency collapsing. Because conditional branch outcomes are resolved based on actual data values, performing control-flow speculation gives some insights into these data values. Embodiments of the present invention are shown that focus on the two cases where the conditional branch is either a branch if equal instruction and this instruction is predicted as taken ("branch if equal and predicted as taken"), or branch if not equal instruction and this instruction is predicted as not taken ("branch if not equal and predicted as not taken"). If a branch if equal and predicted as taken or a branch if not equal and predicted as not taken then it can be safely predicted that the two operands used to determine the branch condition are equal.

The invention is described with regards to Intel Architecture 32-bit ("IA-32") instruction set in which the branch if equal instruction is implemented using the "je" instruction and the branch if not equal instruction is implemented using the "jne" instruction. As used herein, the "je" instruction when predicted as taken is represented as "je and taken" and the "jne" instruction when predicted as not taken is represented as "jne and not taken". The invention is described with regards to the IA-32 instruction set, however, this invention is not limited to the use of that instruction set.

Control-flow speculation is defined herein as speculating or predicting the direction to which control will be transferred. Examples of control-flow speculation instructions are the conditional branch instructions. Data collapsing is defined herein as replacing an operand with a predicted value in order to potentially save having to access memory where this access causes a reduction in processor performance.

Operands, as used herein, are the objects of a computer instruction. Most instructions operate on several source operands and generate results. The operands refer to source and destination locations where values are read from or written to. Depending upon the processor architecture employed, the operand may be either a logical register or a location in memory. The operand may also be an immediate value. An immediate value, as used herein, is a data value that is contained in the instruction itself rather than pointed to by an address in the instruction. Generally, a source operand is a value operated upon by a processor in response to an instruction to produce a result. The result is stored in a destination operand specified by the instruction. Hence, a source operand has its contents read, whereas, data is written into the destination operand.

Predicting je and taken or jne and not taken is implicitly predicting relationships between the values that cause the setting of the zero flag. The prediction that the two operands are equal, can be used by data dependent instructions that follow the branch instruction. This data dependency collapsing is safe since a data misprediction means a control-flow misprediction, and whenever a control-flow misprediction occurs, the pipeline is flushed thus resulting in the removal from the pipeline of all the instructions occurring after the branch instruction, including the data mispredicted once. The following code fragment example illustrates the main principle of the invention:

```
load eax, A
cmp eax, 4
jne label      /* branch to label if eax is not equal to 4 */
add eax, ebx
  .
  .
  .
label:....
```

In this example the content of memory location A is loaded into the register eax and its value is compared against the immediate value 4. If register eax is not equal to 4 then the processor jumps to "label", otherwise the processor executes the add instruction following the branch instruction. If the branch instruction is predicted as "not-taken" by the branch predictor, it implies that the value of the eax register, which is used by the add instruction, is 4 even if this value has not already been loaded yet from the memory by the prior load instruction. If the prediction that register eax equals 4 is incorrect, then the add instruction would be flushed because there was a branch misprediction (i.e., the prediction that the branch would not be taken was a misprediction and this misprediction causes the pipeline to be flushed).

Two embodiments of this invention performing safe data dependency collapsing based on control-flow speculation are presented. The first embodiment performs pre-renaming work by translating architectural registers. The second embodiment performs the data dependency collapsing directly in the renaming stage. The number of architectural registers available depends on the instruction set.

This invention applies when the je instruction is predicted to be taken or the jne instruction is predicted to be not taken. In IA-32, these branch instructions are actually broken into two macro-instructions: a compare instruction followed by a conditional flow redirection instruction. In other instruction sets, however, the actions associated with both the compare and conditional flow redirection instructions are done atomically. The compare instruction, upon execution, sets various instruction flags and, in particular, sets the zero flag. The je and the jne instructions use the zero flag to determine whether or not to branch. Because this invention utilizes the je instruction (i.e., je and taken) and jne instruction (i.e., jne and not taken), it makes use of only the zero flag. If the two operands of the compare instruction are equal then the zero flag is set to one ("1"), but if the two operands are not equal then the zero flag is set to zero ("0").

The compare operation and the setting of the zero flag, however, may be performed by other instructions which are not an explicit compare instruction. These instructions which modify the zero flag but are not explicit compare instructions will be referred to hereinafter as implicit compare instructions. These implicit compare instructions compare the destination register with zero after executing the instruction. For example, from the perspective of the zero flag, the instruction "add eax, 4" is the same as the instructions "add eax, 4" and "cmp eax, 0". Because this invention may be practiced using either an explicit compare instruction or an implicit compare instruction, we will not differentiate between the two and will simply refer to these instructions that modify the zero flag as compare instructions.

As stated earlier, the operands of a compare instruction may be a register or an immediate value. The compare instruction may be of two types. The first type compares a register with an immediate value, e.g., cmp eax, 2. In this case the value of the register eax is compared with the immediate value 2. The second type compares two registers, e.g., cmp eax, ebx. The present invention uses the information captured via the compare instruction and the control-flow speculation to collapse the data dependency graph by replacing an unavailable value of a source register with either an immediate value or a likely to be generated earlier register. When the compare instruction specifies two registers for the comparison, we safely predict that the values in the two registers are equal. This is helpful especially when the value for one register is generated and is thus available much earlier than the value for another register.

One method to find the register which should be replaced is to predict which of the two compare operands is the early register and which one is the late register. The register holding the value generated first is known as the early register, while the other is called the late register. Upon predicting which operand is the early register and which operand is the late register, we can translate any reference to the late register towards the early register. One way to predict the early and late registers is to set the register defined most recently (appears later in the program order) as the late register. This implementation requires a least recently used ("LRU") mechanism to keep track of the order among the architectural registers. Another method for predicting the early and late registers is to employ a binary predictor to make this decision.

Knowing which register is the early register is beneficial because there is a higher probability that the early register will be "defined" before the late register. The term "defined", as used in this context, means that the register (operand) contains a value which is the proper value for the instruction to use. Predicted earliest defined operand, as used herein, is the early register and predicted latest defined operand, as used herein, is the late register.

Another method to determine which register should be replaced is to determine whether any of the two register involved in the compare instruction was previously initialized by a move-immediate instruction. If one of the registers of the compare instruction was previously assigned to an immediate value by such a move instruction, then it is preferable to translate the other operand to that immediate value, even if that other operand is earlier. The latter method can be illustrated by the following example:

| | |
|---|---|
| add | ebx, 4 |
| move | eax, 2 |
| cmp | eax, ebx |

In this example, although ebx is defined earlier (the architectural register ebx has a value written to it earlier than the architectural register eax) than eax, it is preferable to translate ebx to eax because eax contains an immediate value (in this example, eax contains the immediate value 2).

II. Hardware Involved in the Architectural Register Translation Scheme

Referring to the figures in which like numerals indicate like elements, FIG. 1a is a block diagram illustrating the hardware required for one embodiment of the present invention using an architectural register translation scheme. The architectural register translation scheme applies to both in-order and out-of-order processors. A processor 10 shown in FIG. 1 includes an instruction cache 110, a branch prediction unit 115, an instruction fetch unit 120, a decode unit 125, a post-decode unit 130, and an execution unit 135.

Instruction cache 110 is a high-speed cache memory for storing instructions which are fetched from main memory. Instruction cache 110 stores commonly or recently accessed blocks of data. The cache may be structured in any suitable manner, including set associative or direct mapped structures.

Branch prediction unit 115, in general, generates branch predictions for the branch instructions, directs the instruction fetch unit 120 to retrieve the program instructions in an order corresponding to the branch predictions, and redirects the instruction fetch unit 120 based on a branch misprediction. Branch prediction unit 115 performs a branch prediction whenever a branch instruction is fetched.

If a branch prediction was incorrect, the instructions subsequent to the mispredicted branch that have entered the instruction processing pipeline are flushed, and the correct instructions are fetched from instruction cache 110. In such situations, results of instructions in the original program sequence which occur after the mispredicted branch instruction are discarded.

Instruction fetch unit 120 retrieves program instructions from instruction cache 110. The program instructions may include compare, add, and branch instructions. Which program instruction is retrieved is determined by whether a control flow instruction such as a branch is involved. If the branch instruction is not involved then instructions are fetched sequentially from instruction cache 110. However, a branch instruction (or a prediction that a branch will occur) causes instructions to be fetched in a non-sequential manner with branch prediction unit 115 providing to instruction fetch unit 120 the address (i.e., branch prediction unit provides the "target" address which is embedded in the instruction) for the next instruction to be fetched from instruction cache 110.

Decode unit 125 decodes into microcode each instruction fetched from instruction fetch unit 120. Decode unit 125 receives the instruction encoding value from instruction fetch unit 110, and prepares the instruction encoding value by translating the instruction encoding value into a format which can be executed. The microcodes for instructions implementing this invention (compare, branch, and other instructions such as the add instruction which modify the zero flag, i.e., the zero bit) include for the compare instruction, the source register operands which are compared; for the branch instruction, the target address; and for the instructions that modify the zero flag, the source operands and the destination operand to which the result is stored. Once the instruction has been decoded into a usable format, the decoded instruction is sent to post-decode unit 130.

Post-decode unit 130 modifies the instructions and creates the necessary storage items needed to modify those instructions so that the data dependencies after a branch instruction can be collapsed. Post-decode unit 130 performs the record keeping needed for data dependency collapsing using the following two data stores: a compare operand buffer ("COB") 145 and a register translation table ("RTT") 150. COB 145 stores operand information for the most recent instruction that modified its zero flag. COB 145 has only one entry, i.e., COB 145 has operand information stored for only one instruction at a time. The entry in COB 145 has the following format:

| Valid | Register Number | Register/Immediate | Immediate Value/Register Number |
|---|---|---|---|

COB 145 has the following fields:
(1) A one bit "valid" field indicating whether the information in the entry is valid. The field is set to valid ("1") when a new entry is inserted but is set to invalid ("0") when a branch misprediction occurs, or either of the architectural registers (i.e., the architectural register number for operand #1 or the immediate value/architectural register number for operand #2) is killed.
(2) A "register number" field containing the architectural register identifier of the first operand.
(3) A one bit "reg/imm" field indicating whether the second operand of the instruction modifying its zero flag is a register or an immediate value. If the second operand is a register then the bit is set to "1" but if the second operand is an immediate value then the bit is set to
(4) An "immediate value/register number" field containing the immediate value or the architectural register identifier of the instruction's second operand.

Instruction information is inserted into RTT 150 upon encountering je and taken or jne and not taken. RTT 150 contains a subset of the information in COB 145. RTT 150 has the following format:

| Valid | Register/Immediate | Immediate Value/Register Number |
|---|---|---|

RTT 150 has the following fields:
(1) A one bit "valid" field indicating whether the information for the entry in the buffer is valid. The field is set to valid ("1") when a new entry is inserted but is set to invalid ("0") when a branch misprediction occurs or an instruction writes to either of the architectural registers (i.e., the architectural register indexing RTT 150 or the architectural register found in RTT 150).
(2) A one bit "register/immediate" field indicating whether the entry in the "immediate value/register number" field is an architectural register or an immediate value. If the entry is an architectural register then the bit is set to "1" but if it is an immediate value then it is set to "0".
(3) An "immediate value/register number" field containing an immediate value or the architectural register identifier for the early register.

The RTT format is similar to the COB format, however, one difference being that only one entry is provided for each architectural register, since register/immediate or register-late/register-early pairs may be alive at the same time for all architectural registers. As explained earlier, the number of architectural registers depends on the instruction set. For example, in the IA-32 instruction set, there are eight general purpose architectural registers and thus eight corresponding entries in RTT 150. If a je and taken or jne and not taken is encountered and COB 145 is valid (i.e., valid field of COB 145 is set to "1"), then RTT 150 is modified such that operand information is copied from COB 145 to RTT 150 and the valid field for the RTT entry corresponding to the COB entry is set to "1". RTT 150 is indexed either with the register number from operand one, if the second operand is an immediate value, otherwise, with the register number corresponding to the predicted late register. Because one of the operands from the COB entry is used as an index, RTT 150 needs only to store the other operand. If a RTT entry is valid, then the indexing register can be safely translated into the recorded information, i.e., either to an immediate value or to another earlier defined architectural register.

Once data dependencies in the instructions have been collapsed, those instructions are sent to the execution unit 135. Execution unit 135 executes the instructions which are decoded by instruction decode unit 125. Execution unit 135 can be for example, an arithmetic logic unit or the like.

III. Hardware Involved in the Physical Register Reuse Scheme

Figure 1B:
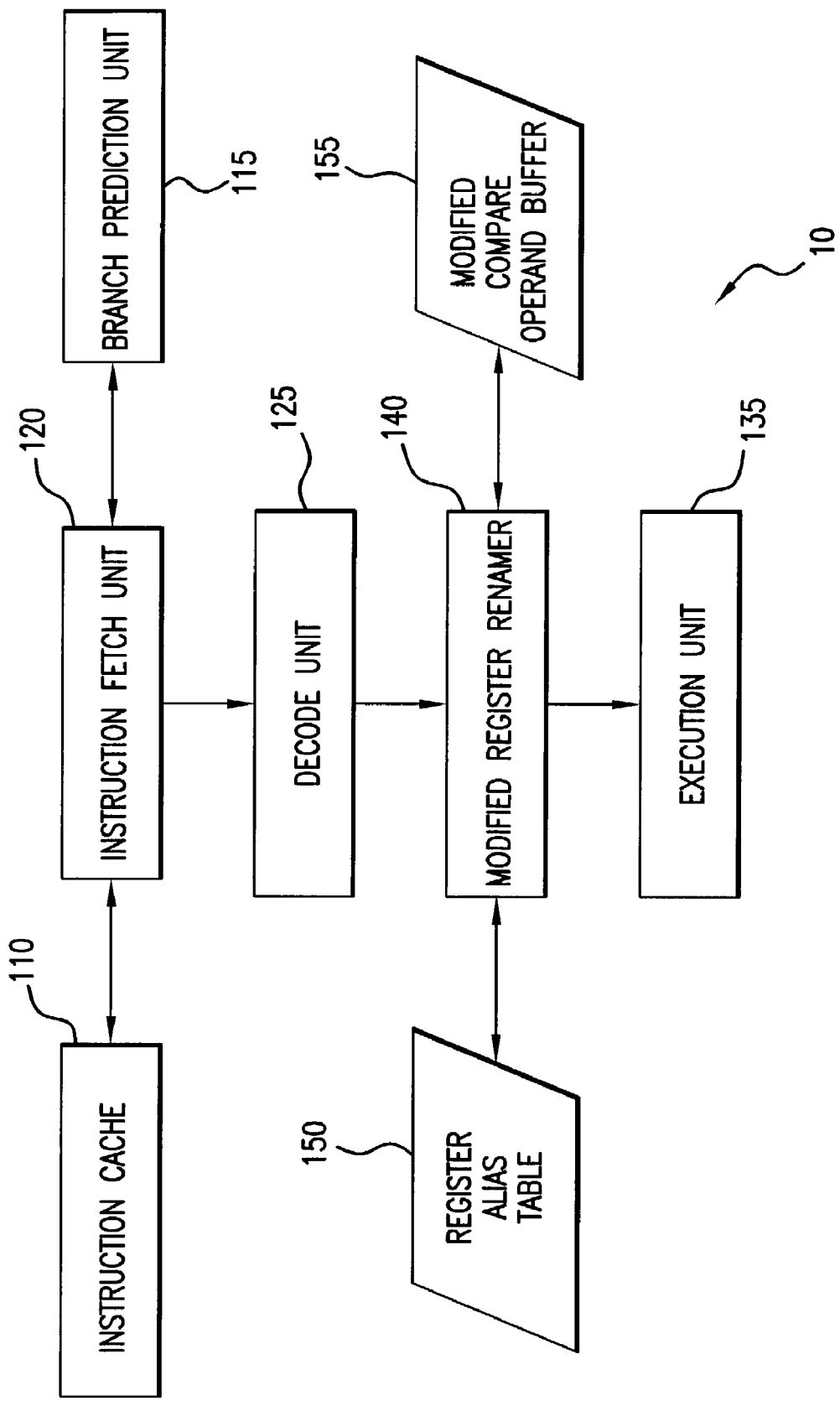
FIG. 1b is a block diagram illustrating the hardware involved in a second embodiment of the present invention.
Figure 2B:
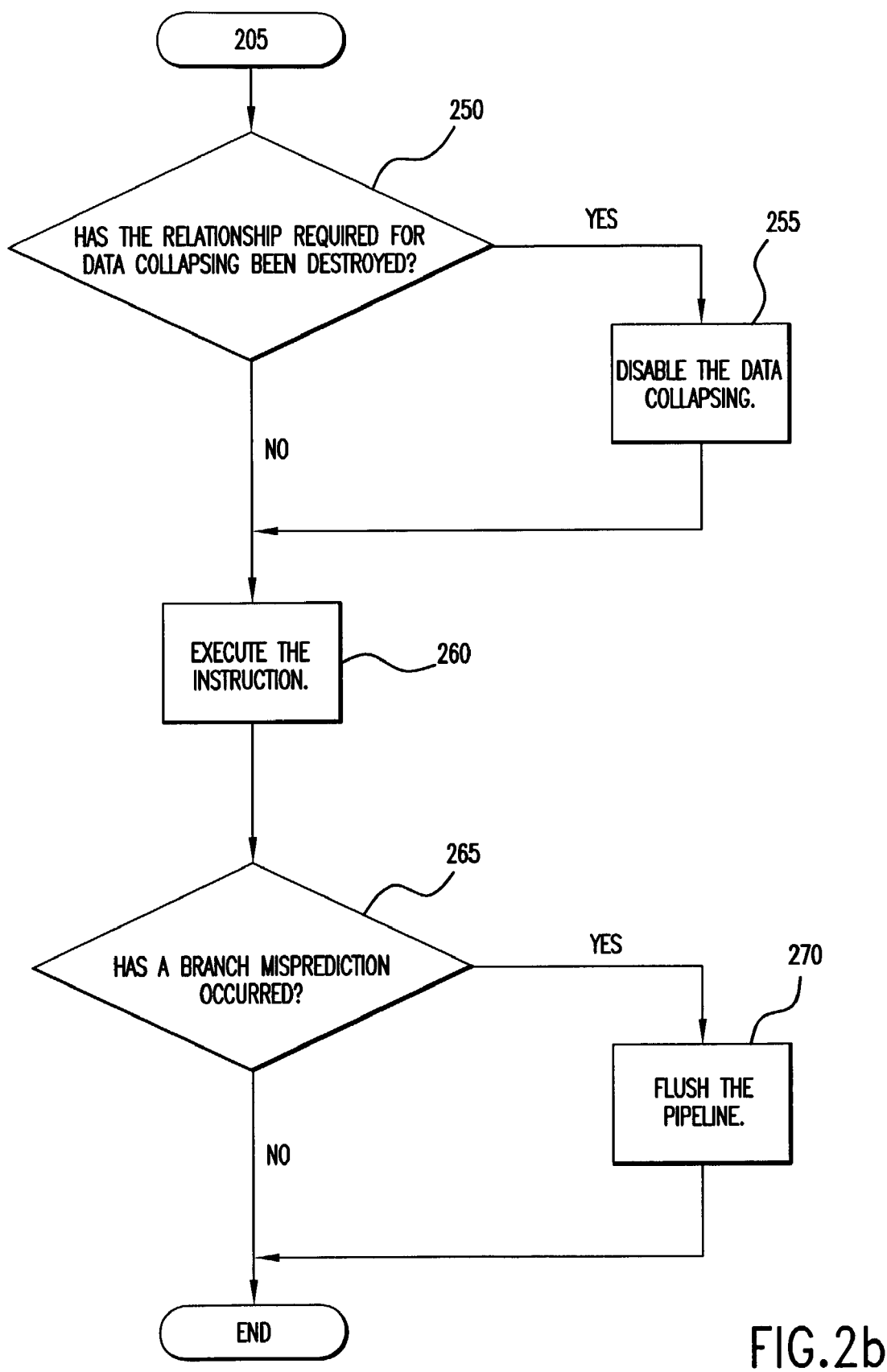
FIG. 2 is a flowchart illustrating the general pipeline steps involved in performing safe dependency collapsing based on control-flow speculation for one embodiment of the present invention.

FIG. 1*b* is a block diagram illustrating the hardware required for one embodiment of the present invention using a register reuse scheme. The register reuse scheme applies to out-of-order processors. In this embodiment, a modified register renamer 140 performs register renaming and also data collapsing. Register renaming is a well known technique that permits parallelism by dynamic allocation of a set of registers. Renaming an architectural register may involve mapping an architectural register to a physical register. In this embodiment, these mappings may be stored in a Register Alias Table ("RAT") 150. RAT 150 maintains the latest mapping for each architectural register. RAT 150 is indexed by architectural registers, and provides mapping to corresponding physical registers.

In this embodiment, modified register renamer 140 does the register renaming and also the data collapsing as compared to the first embodiment where the data collapsing was done using post-decode unit 130. Instead of translating the architectural registers as proposed in the first embodiment, here, the data dependency collapsing is performed by modified register renamer 140.

Modified register renamer 140 is used to identify a group of registers that are available for the execution of a particular computing task, the identification done by using some sort of mapping scheme. In a typical register renaming scheme, register numbers appearing in instructions fetched from memory are mapped to a set of physical registers. In this particular embodiment, architectural registers are mapped to physical registers in RAT 150. Whenever data dependency collapsing can be performed, modified register renamer 140 implements the data dependency collapsing by remapping architectural registers to physical registers which contain immediate values or earlier defined (and hopefully available) register values. In the first embodiment described in FIG. 1*a*, the renaming was performed by execution unit 135, that is, the renamer was embedded in execution unit 135. The technique of register renaming utilizing a renamer device is well-known in the prior art.

In this second embodiment, modified register renamer 140 uses a modified compare operand buffer ("MCOB") 155 in order to perform the record keeping required to implement data collapsing using the register reuse scheme. MCOB 155 has only one entry at a time. The entry has the following format:

| Valid | Architectural Register Id. | Physical Register Id. |
|---|---|---|

MCOB 155 has the following fields:
(1) A one bit "valid" field indicating whether the information for the entry in the buffer is valid. The field is set to valid ("1") when a new entry is inserted but is set to invalid ("0") when a branch misprediction occurs, the pointed physical register is reclaimed, or the architectural register is killed.
(2) An "architectural register id" field containing the architectural register identifier of the late register.
(3) A "physical register id" field containing the physical register where the immediate value or the early register is located.

If the MCOB entry is valid, then the architectural register id. can be safely translated to the physical register id.

IV. General Steps Involved in Data Dependency Collapsing Based on Control Flow Speculation FIG. 2 is a flowchart illustrating the general pipeline steps involved in one embodiment of the present invention. In step 200, instruction fetch unit 120 gets the next instruction to be processed. Instruction fetch unit 120 fetches the instruction from instruction cache 110. If a branch prediction has been made, then branch prediction unit 115 supplies the target address from where instruction cache 110 should get the next instruction. In step 225, decode unit 125 decodes the instruction fetched by instruction fetch unit 120. Decoding the instruction involves converting the instruction into microcode. In step 230, processor 10 determines if an instruction which modifies its zero flag or a je and taken or a jne and not taken have been encountered. If such an instruction has been encountered then in step 235, processor 10 performs the record keeping required for safe data dependency collapsing based on control flow speculation. The required record keeping will be discussed in greater detail below.

In step 240, processor 10 determines if the operands of an instruction can be collapsed. If the operands can be collapsed, then in step 245, post-decode unit 130 or modified register renamer 140 performs the safe data dependency collapsing, i.e., appropriate operands of instructions subsequent to the branch instruction are replaced by other operands which are predicted to equal the replaced operand. This collapsing feature is especially useful when the replacing operand equals an immediate value or an earlier defined, available operand. The collapsing feature will be discussed in greater detail below.

In step 250, processor 10 determines if the relationship required for data collapsing has been destroyed. If this relationship has been destroyed, then in step 255, post-decode unit 130 disables the data collapsing. The disabling of data collapsing will be discussed in greater detail below. In step 260, the instruction is executed. In step 265, branch prediction unit 115 determines if a branch misprediction occurred. If a branch misprediction occurred then in step 270, the pipeline is flushed meaning that the instructions subsequent to the mispredicted branch that have entered the instruction processing pipeline are removed, and the required instructions are fetched from instruction cache 110. All entries in the RTT and COB, or the MCOB are invalidated (i.e., the valid field is set to "0") in the case of any pipeline flush (e.g. mispredicted branch, context switch, etc.).

V. Steps Involved in Data Dependency Collapsing Based on Control-Flow Speculation Using the Architectural Register Translation Scheme One embodiment of the present invention uses an architectural register translation scheme to perform the data collapsing. The data collapsing includes the three basic phases that are performed after the decode stage and before the execution stage. The first two phases refer to the process of performing the data prediction itself (the detection action), while the third phase refers to the potential use of this prediction (note that in architectures providing atomic compare-and-branch instructions, the first two phases are combined). This embodiment translates source architectural registers before execution. If an out-of-order processor is employed, then the translation is done before register renaming.

In the first phase, whenever a compare instruction is decoded, the information corresponding to the compare instruction is stored in COB 145. Whenever a compare instruction is decoded, the valid field of COB 145 is set to "1" and the corresponding fields are updated according to the operands. As explained earlier, the compare instruction includes both explicit and implicit compare instructions. The COB entry is turned invalid whenever an instruction is decoded that writes into one of the architectural registers stored in either the "register number" field or the "immediate value/register number" field of COB 145.

In the second phase, whenever a "branch if equal" or a "branch if not equal" instruction is decoded and the "branch if equal" instruction is predicted as taken or the "branch if not equal" is predicted as not taken, and the COB entry is valid, then RTT 150 is modified. RTT 150 is modified such that operand information is copied from COB 145 to RTT 150 and the valid field for the RTT entry corresponding to the COB entry is set to "1". RTT 150 is indexed either with the register number from operand one, if the second operand is an immediate value, otherwise, with the register number corresponding to the predicted late register. Because one of the operands from the COB entry is used as an index, RTT 150 needs only to store the other operand. If a RTT entry is valid, then the indexing register can be safely translated into the recorded information, i.e., either to an immediate value or to another earlier defined architectural register.

RTT 150 basically describes all the possible translations (i.e., all the possible data collapsing). If an RTT entry is valid, it means that the indexing register can be safely translated into the recorded information, i.e. either to an immediate value or to another (earlier defined) architectural register. The lifetime of an RTT entry starts from the decoding of the je and taken or jne and not taken and ends (i.e., the entry is invalidated) when a decoded instruction writes into one of the operands recorded in COB 145 (i.e., the decoded instruction writes into an architectural register in either the "register number" field or the "immediate value/register number" field of COB 145). Invalidation of entries is performed by setting the "valid" field of that entry to 0. Details as to invalidating the COB entry or RTT entries are provided below. The whole RTT and the COB are invalidated in the case of any pipeline flush (e.g., mispredicted branch, context switch, etc.).

The third phase of this technique uses the information in RTT 150 for data dependency collapsing. Any decoded instruction performs a RTT lookup for each of its source operand. If a valid entry is found, the immediate value or the architectural register in RTT 150 replaces the corresponding source operand; this operation is termed register translation. The following example illustrates data collapsing using the architectural register translation scheme:

1. cmp eax, #2
2. je [branch predictor predicts that this branch is taken]
3. add eax, ebx
4. add ecx, eax
5. add edx, #4
6. cmp ecx, edx
7. jne [branch predictor predicts that this branch is not taken]
8. add edx, ebx When instruction 1, the compare instruction which modifies the zero flag, is decoded, COB 145 is updated with the following information: valid=1; register number=eax; register/immediate="0"; immediate value/register number=2. The decoding of instruction 2 modifies RTT 150 such that operand information is copied from the COB entry into a corresponding RTT entry. Instruction 2 causes RTT 150 to be updated with the following information: valid=1; register/immediate="0"; immediate value/register number=2. Because the second operand of the compare instruction contains an immediate value, the RTT entry corresponding to this instruction is indexed by the architectural register (the first operand, in this case register eax). For instruction 3, the source register eax is translated to the immediate value 2 since its corresponding entry in the RTT is valid. Instruction 3 also specifies eax as a destination register and this remains unaffected by the translation operation. However, because instruction 3 specified eax as a destination register, the valid field for the entry in COB 145 is set to "0" and the valid field for the RTT entry indexed by eax is also set to "0". In addition, all RTT entries which have eax in its "immediate value/register number" field are also set to "0" to indicate that the entry is no longer valid. As a result of the invalidation, instruction 4 misses in the RTT for eax. Instruction 5 misses edx as well.

Instruction 6 is a compare instruction which modifies its zero flag and thus the information corresponding to the instruction is input into COB 145. Instruction 6 causes COB 145 to have the following information: valid=1; register number=ecx; register/immediate="1"; immediate value/register number=edx. If we use the static predictor described above, edx is considered to be the late register because architectural register edx in instruction 5 is written after architectural register ecx in instruction 4. Instruction 7 is a branch if not equal instruction and is predicted as not taken. This instruction causes RTT 150 to be modified such that operand information for the COB entry is copied to an edx RTT entry. Instruction 7 causes RTT 150 to be updated with the following information: valid=1; register/immediate="1"; immediate value/register number=ecx. This entry in RTT 150 is indexed with the architectural register edx. Instruction 8 translates the source edx into ecx.

RTT 150 may have more than one valid entry at any given time. For example, in the above sequence of instructions, if instruction 3 was deleted, then after instruction 7, RTT 150 would have the following two valid entries: an entry indexed by eax; and an entry indexed by edx.

Figures 1, 3A:
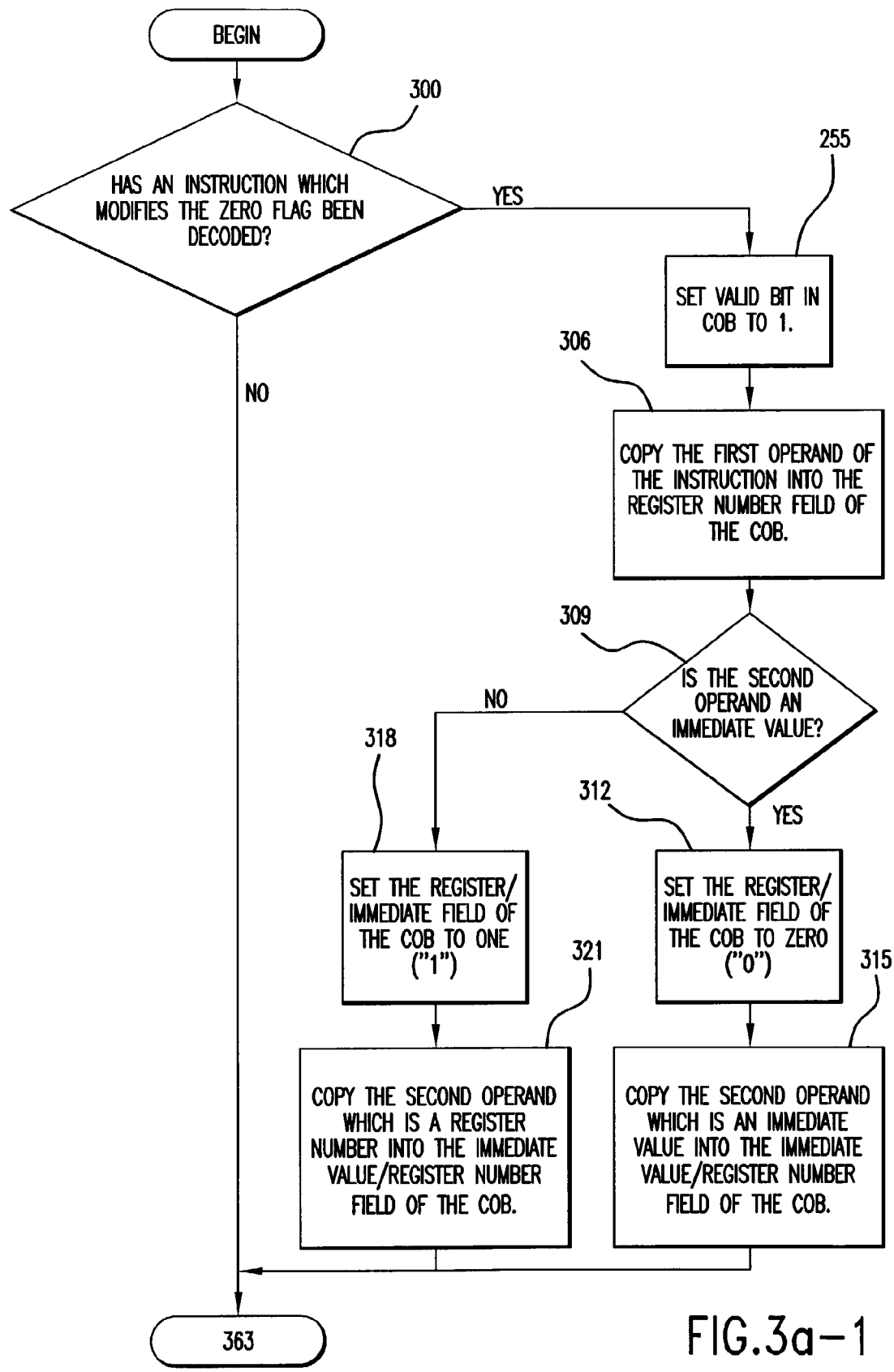
FIG. 3a is a flowchart illustrating the record keeping steps required in order to collapse data dependencies based on control-flow speculation in one embodiment of the present invention using an architectural register translation scheme.
Figures 2, 3A:
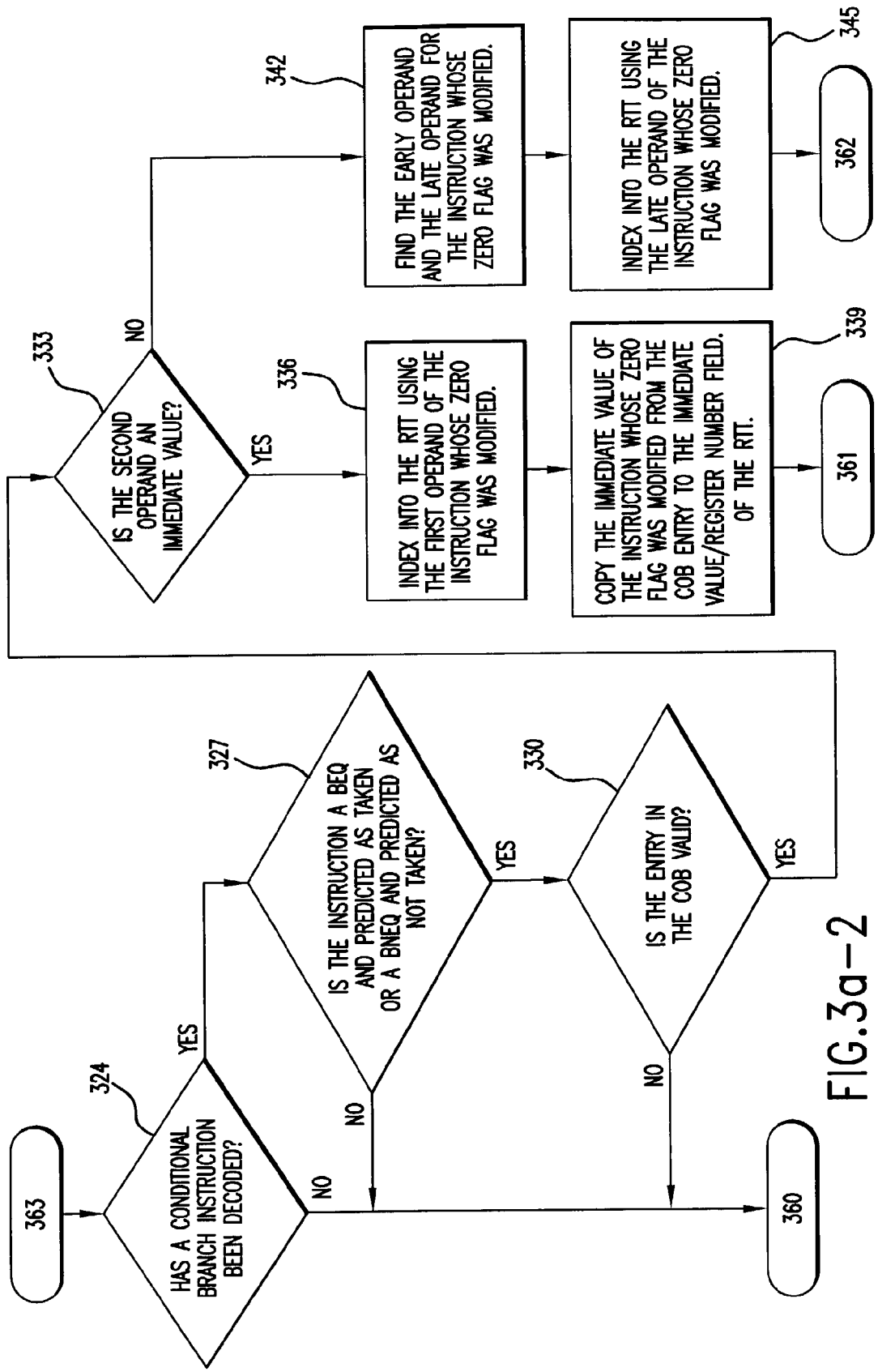
Figures 3, 3A:
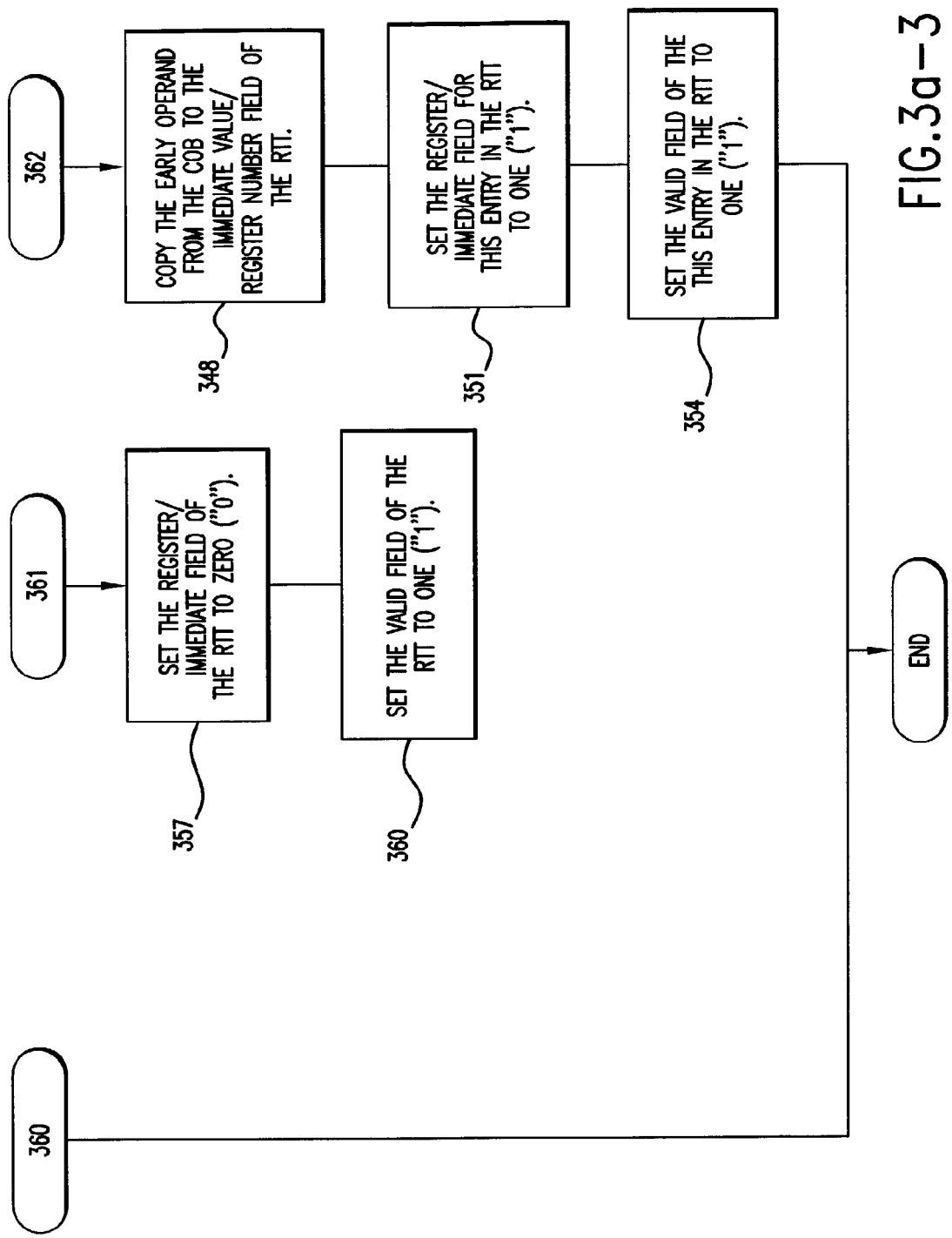

FIG. 3*a* is a flowchart illustrating the record keeping steps required in order to collapse data dependencies based on control-flow speculation in one embodiment of the present invention using an architectural register translation scheme. FIG. 3*a* further elaborates on steps 230 and 235 of FIG. 2. In step 300, post-decode unit 130 determines if an instruction which modifies the zero flag has been decoded. In IA-32, such instructions include the compare and the add instructions. If the decoded instruction does not modify the zero flag, then record keeping is not performed and thus COB 145 and RTT 150 are not modified. However, if an instruction which modifies the zero flag is decoded, then in step 303, the valid field in COB 145 is set to valid ("1") to indicate that the entry is valid. In step 306, the first operand of the instruction which modifies the zero flag is copied into the register number field of COB 145. In step 309, post-decode unit 130 determines if the second operand of the instruction is an immediate value. If the second operand is an immediate value, then in step 312, the register/immediate field of COB 145 is set to zero ("0") to indicate that the second operand is an immediate value. In step 315, the immediate value of the second operand is copied into the immediate value/register number field of COB 145. If the second operand is not an immediate value, but rather a register number then in step 318, the register/immediate field of COB 145 is set to one ("1") to indicate that the second operand is a register. In step 321, the register number of the second operand is copied into the immediate value/register number field of COB 145.

In step 324, post-decode unit 130 determines if the instruction decoded is a conditional branch instruction. If a conditional branch instruction has been decoded, then in step 327, post-decode unit 130 determines if the instruction decoded is a je and predicted as taken or a jne and predicted as not taken.

If the decoded instruction is either je and taken or jne and not taken, then in step 330, post-decode unit 130 determines if the entry in COB 145 is valid (i.e., the valid field is set to "1"). If the entry is not valid (i.e., the valid field is set to "0"), then the entry is not moved to RTT 150. If the decoded instruction is either a je and taken or jne and not taken and the COB entry is valid, then RTT 150 is modified such that an entry in RTT 150 corresponds to the entry in COB 145.

In step 333, post-decode unit 130 determines if the second operand is an immediate value. If the second operand is an immediate value then in step 336, RTT 150 is indexed using the first operand of the instruction whose zero flag was modified (i.e., the instruction having the entry in COB 145). In step 339, the second operand (which is an immediate value) of the instruction whose zero flag was modified is copied from COB 145 to the "immediate value/register number" field of RTT 150. In step 357, the "register/immediate" field of RTT 150 is set to zero to indicate that an immediate value is in the "immediate value/register number" field of RTT 150. In step 360, the "valid" field is set to "1" to indicate that the RTT entry corresponding to the COB entry is valid.

If the second operand of the instruction whose zero flag is modified (i.e., the instruction having the entry in COB 145) is a register rather than an immediate value then in step 342, the early operand and the late operand are found by using any of the techniques previously described. In step 345, RTT 150 is indexed using the late operand of the instruction whose zero flag was modified. In step 348, the early operand is copied from COB 145 to the "immediate value/register number" field of RTT 150. In step 351, the register/immediate field of RTT 150 is set to "1" to indicate that a register is in the immediate value/register number field of RTT 150. In step 354, the valid field is set to "1" to indicate that the entry is valid.

Figure 3B:
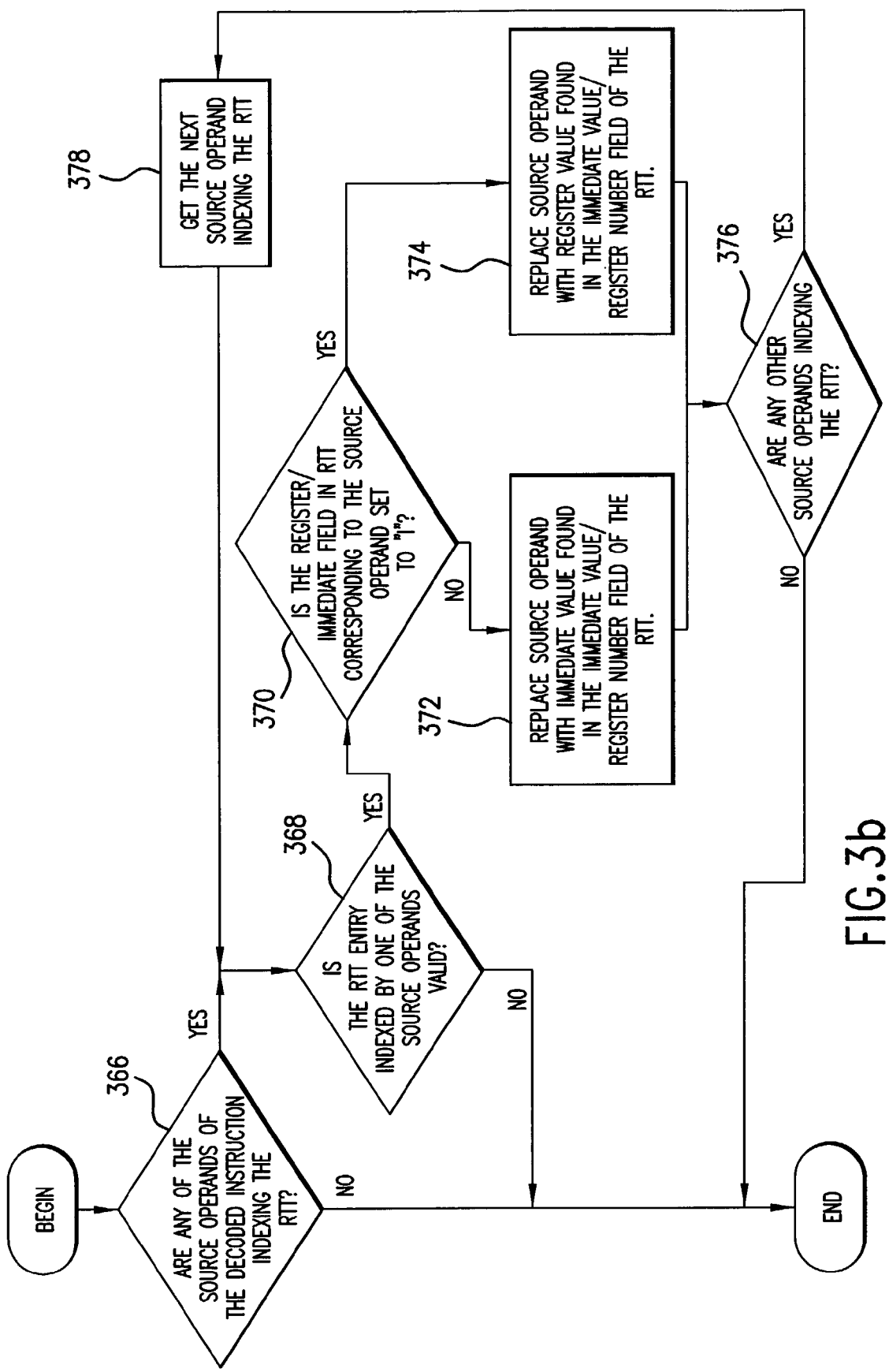
FIG. 3b is a flowchart illustrating the steps required in order to actually collapse data dependencies based on control-flow speculation in one embodiment of the present invention using an architectural register translation scheme.

FIG. 3*b* is a flowchart illustrating the steps required in order to actually collapse data dependencies based on control-flow speculation in one embodiment of the present invention using an architectural register translation scheme. FIG. 3*b* further elaborates on steps 240 and 245 of FIG. 2. In step 366, post-decode unit 130 determines if any of the source operands of the decoded instruction is indexing RTT 150. A source operand is an operand whose value is read but not written as opposed to a destination operand which is written. If none of the source operands are indexing RTT 150 then no data collapsing is performed for that decoded instruction.

If one or more of the source operands for the decoded instruction indexes RTT 150, then for each of those source operands, steps 368 to 378 are performed. In step 368, post-decode unit 130 determines if the RTT entry indexed by one of the source operands is valid. The check for validity is done by making sure that the entry that the particular one of the source operands indexes has its valid field set to "1". If the RTT entry is not valid then data collapsing for that decoded instruction is not performed. If the RTT entry is valid, then in step 370, post-decode unit 130 determines if the register/immediate field in RTT 150 corresponding to the source operand is set to "1". If the register/immediate field is set to "1" then the value in the immediate value/register number field is an architectural register and in step 374, the source operand for the decoded instruction is replaced with the architectural register found in the immediate value/register number field of RTT 150. If the register/immediate field is set to "0" then the value in the immediate value/register number field is an immediate value and in step 372, the source operand for the decoded instruction is replaced with the immediate value found in the immediate value/register number field of RTT 150. In step 376, post-decode unit 130 determines if any other source operands are indexing RTT 150. If no other source operands are indexing RTT 150, then data collapsing for the decoded instruction is complete. However, if other source operands are also indexing RTT 150, then in step 378, the next source operand is obtained and steps 368 to 374 are repeated for this source operand to possible collapse it.

Figures 1, 3C:
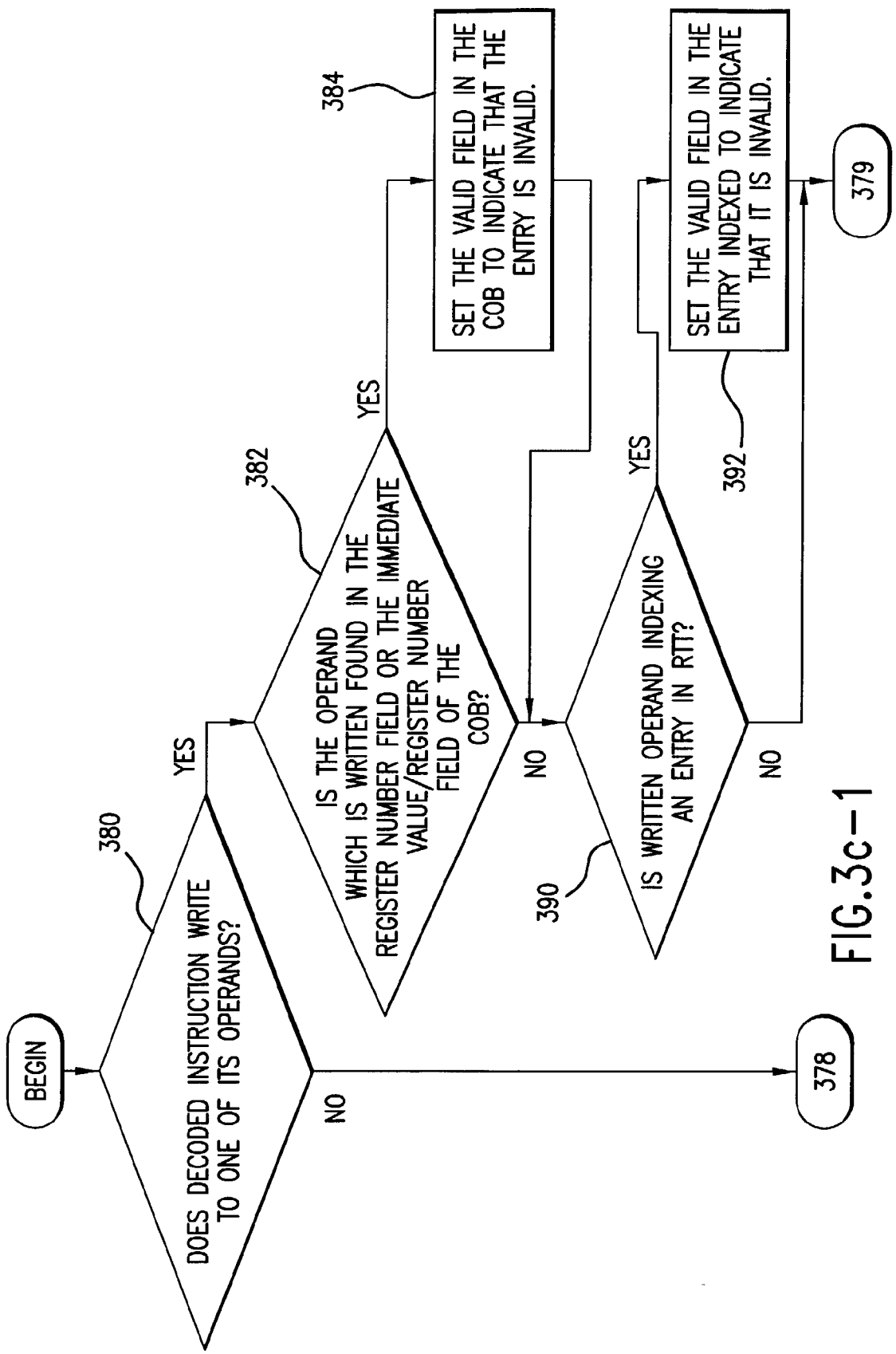
FIG. 3c is a flowchart illustrating the steps required in order to disable data dependency collapsing based on control-flow speculation in one embodiment of the present invention using an architectural register translation scheme.
Figures 2, 3C:
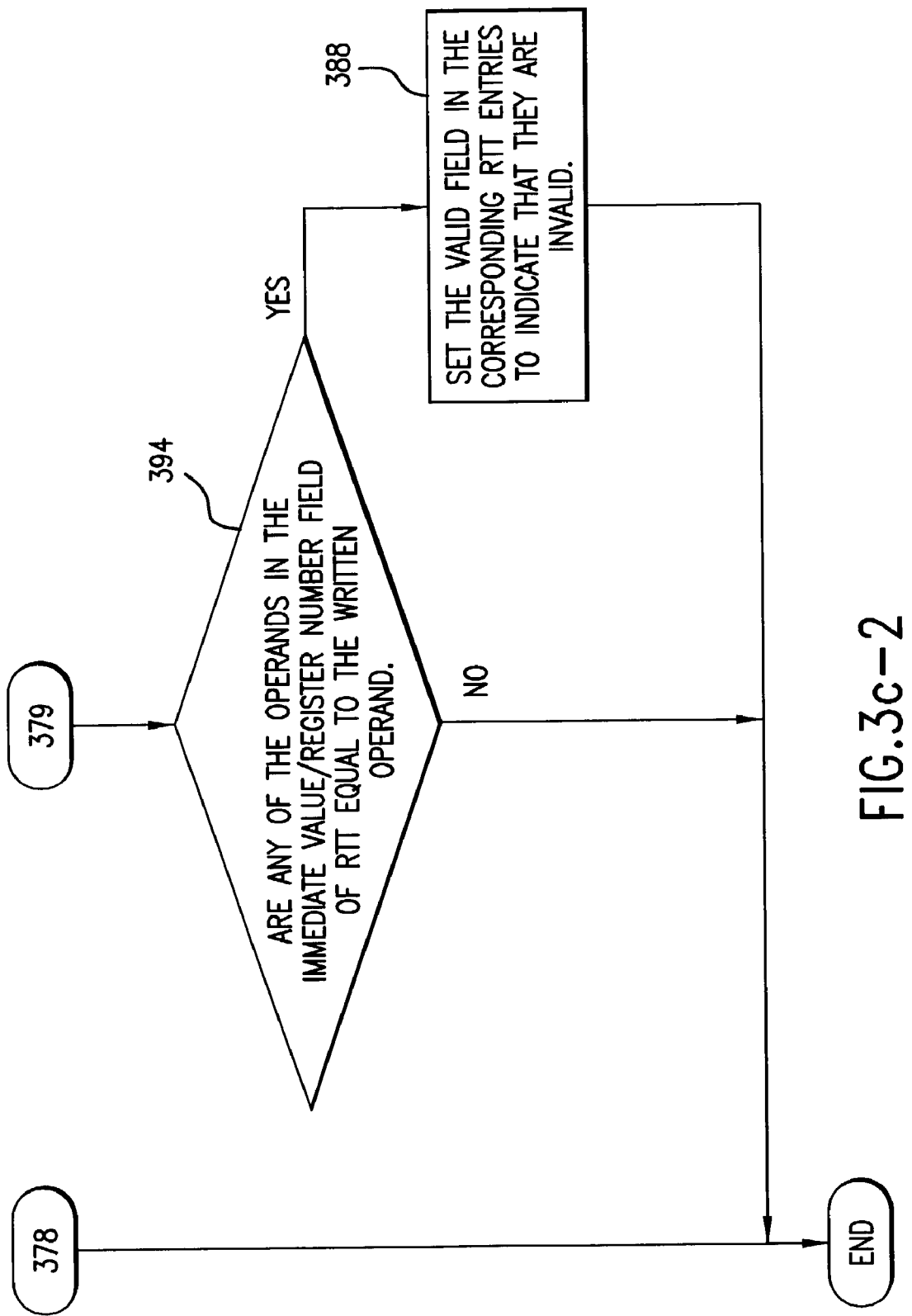

FIG. 3c is a flowchart illustrating the steps required in order to disable data dependency collapsing based on control-flow speculation in one embodiment of the present invention using an architectural register translation scheme. FIG. 3c further elaborates on steps 250 and 255 of FIG. 2. In step 380, post-decode unit 130 determines if any of the decoded instructions write to one of its operands. If the decoded instruction does not write to any of its operands, then neither the entry in COB 145 nor the entries in RTT 150 are invalidated.

If the decoded instruction has a destination register, then in step 382, post-decode unit 130 determines if this destination is found in the register number field or the immediate value/register number field of COB 145. If the decoded instruction does write to operands found in either of those two fields of COB 145 then in step 384, the valid field in COB 145 is set to indicate that the entry is invalid (i.e., the valid field is set to "0"). In step 390, post-decode unit 130 determines if the written operand indexes any of the entries in RTT 150. If RTT 150 indexes any of the entries in RTT 150, then in step 392, the valid field in RTT 150 of the entry indexed is set to indicate that the entry is invalid (i.e., the valid field is set to "0"). In step 394, post-decode unit 130 determines if any of the operands in the immediate value/register number field of RTT 150 equals the written operand. If any of the operands in the immediate value/register number field of RTT 150 equals the written operand, then in step 388, the valid fields of the corresponding RTT entries are set to indicate that they are invalid (i.e., the valid fields are set to "0").

If the decoded instruction does not write to operands found in either the register number field or the immediate value/register number field of COB 145, then the entry in COB 145 is not invalidated. In step 390, post-decode unit 130 determines if the written operand indexes any of the entries in RTT 150. If RTT 150 indexes any of the entries in RTT 150, then in step 392, the valid field in RTT 150 of the entry indexed is set to indicate that the entry is invalid (i.e., the valid field is set to "0"). In step 394, post-decode unit 130 determines if any of the operands in the immediate value/register number field of RTT 150 equals the written operand. If any of the operands in the immediate value/register number field of RTT 150 equals the written operand, then in step 388, the valid fields of the corresponding RTT entries are set to indicate that they are invalid (i.e., the valid fields are set to "0").

If the written operand does not index any of the entries in RTT 150, then in step 394, post-decode unit 130 determines if any of the operands in the immediate value/register number field of RTT 150 equals the written operand. If any of the operands in the immediate value/register number field of RTT 150 equals the written operand, then in step 388, the valid fields of the corresponding RTT entries are set to indicate that they are invalid (i.e., the valid fields are set to "0").

VI. Steps Involved in Data Dependency Collapsing Based on Control-Flow Speculation Using the Physical Register Reuse Scheme The second embodiment uses the physical register reuse scheme in order to perform the data collapsing. In a physical register reuse scheme, the main idea is to record several results into only one physical register whenever all these results are identical. The physical register reuse scheme complies with the concept of this invention that the two operands of a compare instruction are equal and thus the two registers hold the same value. Instead of translating the architectural registers as in the previous embodiment, the data collapsing is performed in modified register renamer 140. In this embodiment, modified register renamer 140 re-maps the late register to the physical register associated with the early register or to a physical register associated with an immediate value. This embodiment requires MCOB 155 but not COB 145 or RTT 150. The following example illustrates this embodiment (assume that architectural register eax is the late register and that architectural registers eax and ecx are mapped to memory locations pr23 and pr19 respectively):

1. cmp eax, ecx
2. je [branch predictor predicts that this branch is taken]
3. add eax, ebx Upon decoding the compare instruction (instruction one), the following information corresponding to that instruction is inserted into MCOB 155: (1) the valid field is set to "1"; (2) the late register eax is inserted into the "architectural register id." field; and (3) the physical address for the early register ecx is inserted into the "physical register id." field. That is, after decoding instruction one, MCOB 155 is updated with the following entry: valid ="1"; architectural register id.=eax; physical register id.=pr19. The branch instruction of instruction 2 is predicted as taken by branch prediction unit 115. Because the MCOB entry is valid, modified register renamer 140 re-maps the late architectural register eax to the physical register associated with the early register. In this example, eax is re-mapped to pr19. As a result, instruction 3 is no longer dependent on eax but on ecx.

In order to handle compare-with-immediate instructions, a physical register must be located containing the same immediate value. In order to find a physical register containing the same immediate value, modified register renamer 140 can perform a lookup into the register file or a value-matching cache. In one embodiment using a register file (i.e., a plurality of registers organized into a "register file"), the register file is searched for the immediate value. If the immediate value is not found in the register file, then MCOB 155 is not updated with the instruction's entry, however, if the immediate value is found in the register file, then MCOB 155 is updated with the instruction's entry.

In another embodiment using a value-matching cache, the entries in that cache are indexed by immediate values, where a cache entry associates an immediate value with a physical register storing that value. If there is a match between the immediate value and the value in the cache, then the architectural register of the compare instruction is mapped to the physical register indicated by the value-matching cache. If the immediate value of a compare instruction is not found in the value-matching cache, then MCOB 155 is not updated with the instruction's entry.

Figures 1, 4A:
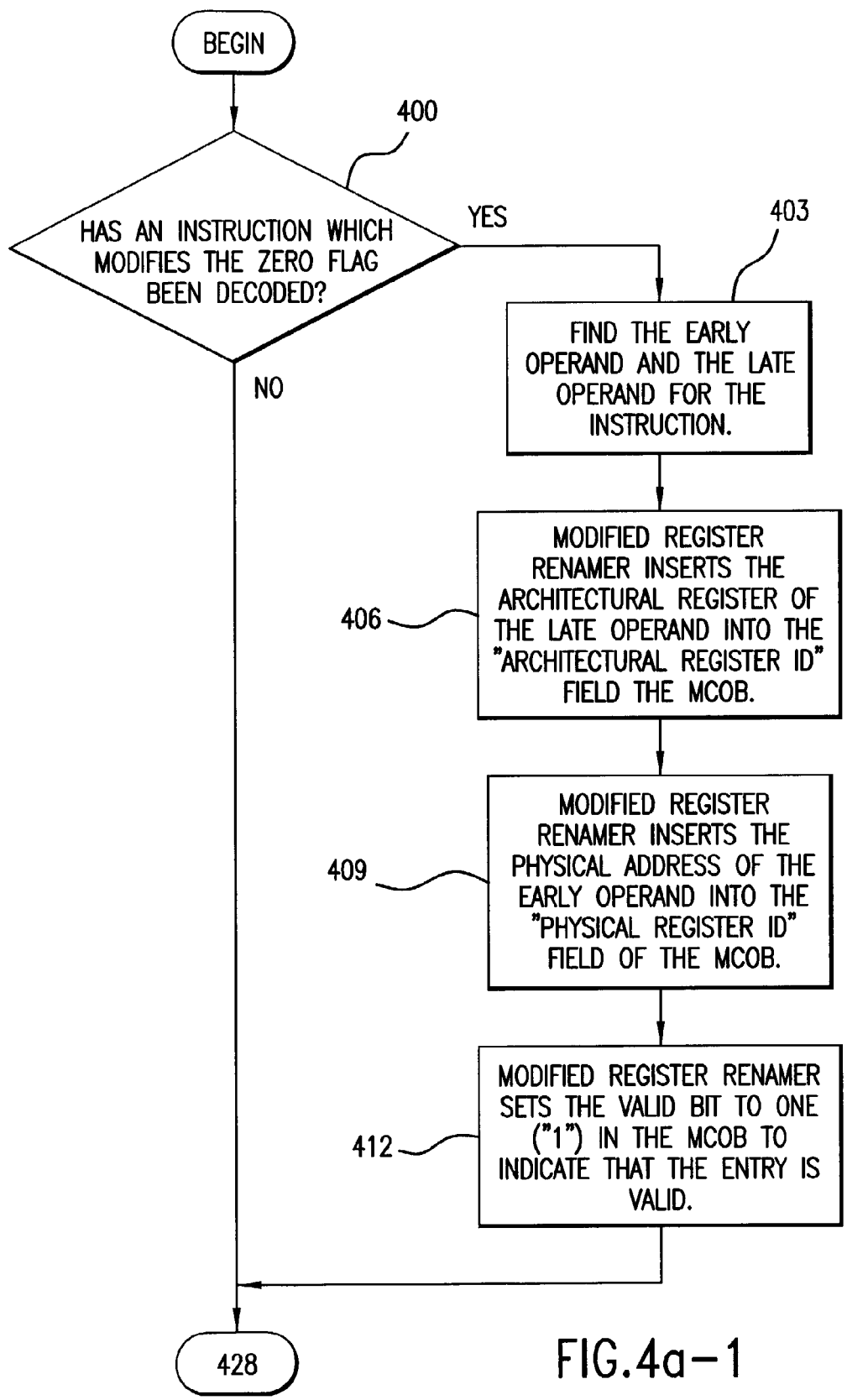
FIG. 4a is a flowchart illustrating the record keeping steps required in order to collapse data dependencies based on control-flow speculation in a second embodiment of the present invention using a physical register reuse scheme.
Figures 2, 4A:
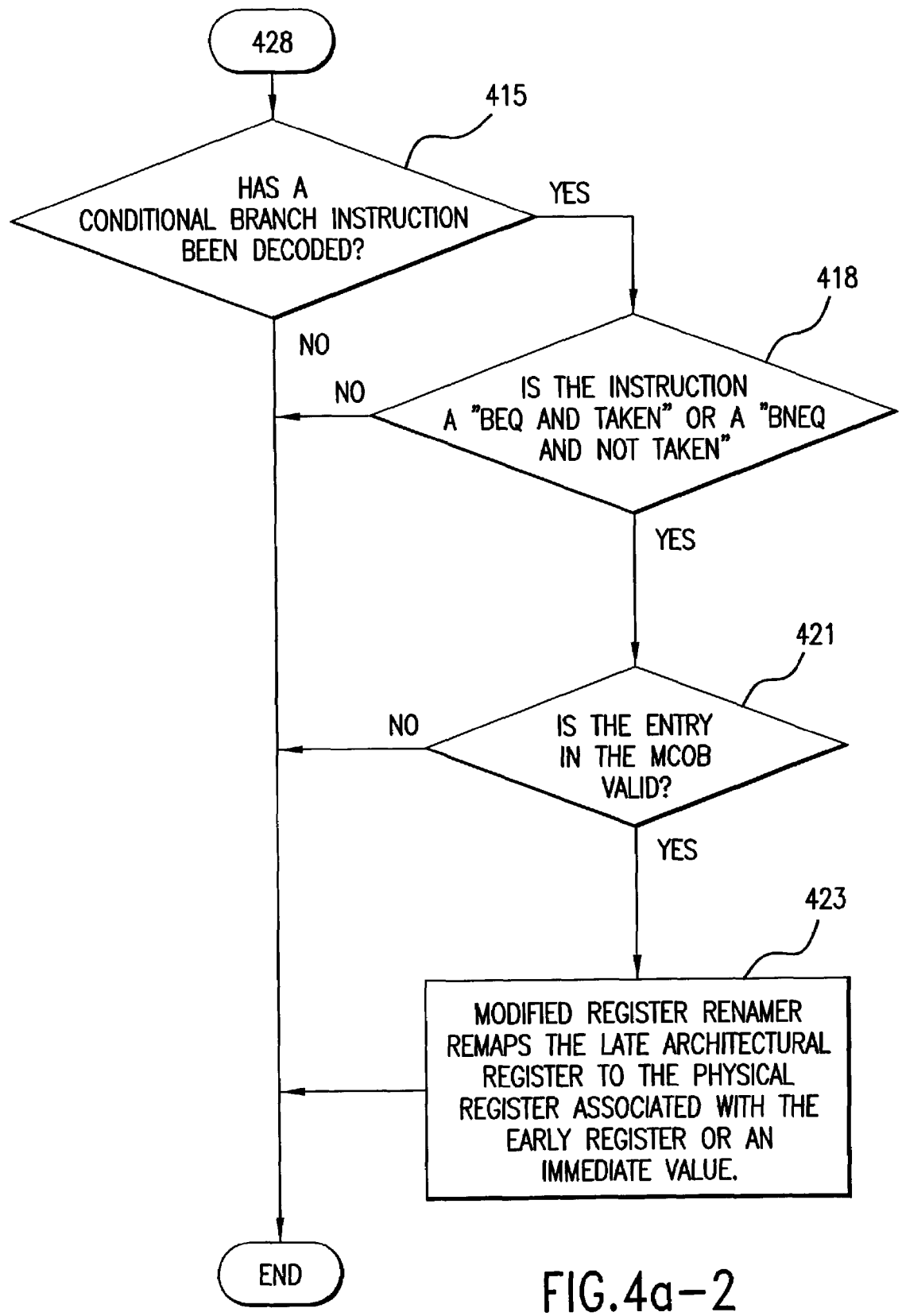

FIG. 4a is a flowchart illustrating the record keeping steps required in order to collapse data dependencies based on control-flow speculation in a second embodiment of the present invention using a physical register reuse scheme. FIG. 4a further elaborates on steps 230 and 235 of FIG. 2. In step 400, post-decode unit 130 determines whether an instruction which modifies the zero flag has been decoded. If the decoded instruction does not modify the zero flag, then record keeping need not be performed and thus MCOB 155 is not modified. However, if an instruction which modifies the zero flag is decoded, then in step 403, the decoded instruction's early operand and late operand are found by using any of the techniques previously described. In step 406, modified register renamer 140 inserts the architectural register of the late operand into the architectural register id field of MCOB 155. In step 409, modified register renamer 140 inserts the physical address of the early operand or an immediate value into the "physical register id" field of MCOB 155. The physical register for an immediate value can be found by either of the techniques described earlier. In step 412, modified register renamer 140 sets the valid field in MCOB 155 to "1" to indicate that the entry is valid.

In step 415, modified register renamer 140 determines if a conditional branch instruction has been decoded. If a conditional branch instruction has been decoded then in step 418, modified register renamer 140 determines if the conditional branch instruction is a branch if equal instruction which is predicted as taken or a branch if not equal instruction which is predicted as not taken. In step 421, modified register renamer 140 checks the entry in MCOB 155 to ensure that it is valid (i.e., the valid field is set to "1"). If the entry in MCOB 155 is valid then in step 423, modified register renamer 140 re-maps the late architectural register found in the architectural register id. field of MCOB 155 to the physical register found in the physical register id. field which is associated with either the early register or the immediate value.

Figure 4B:
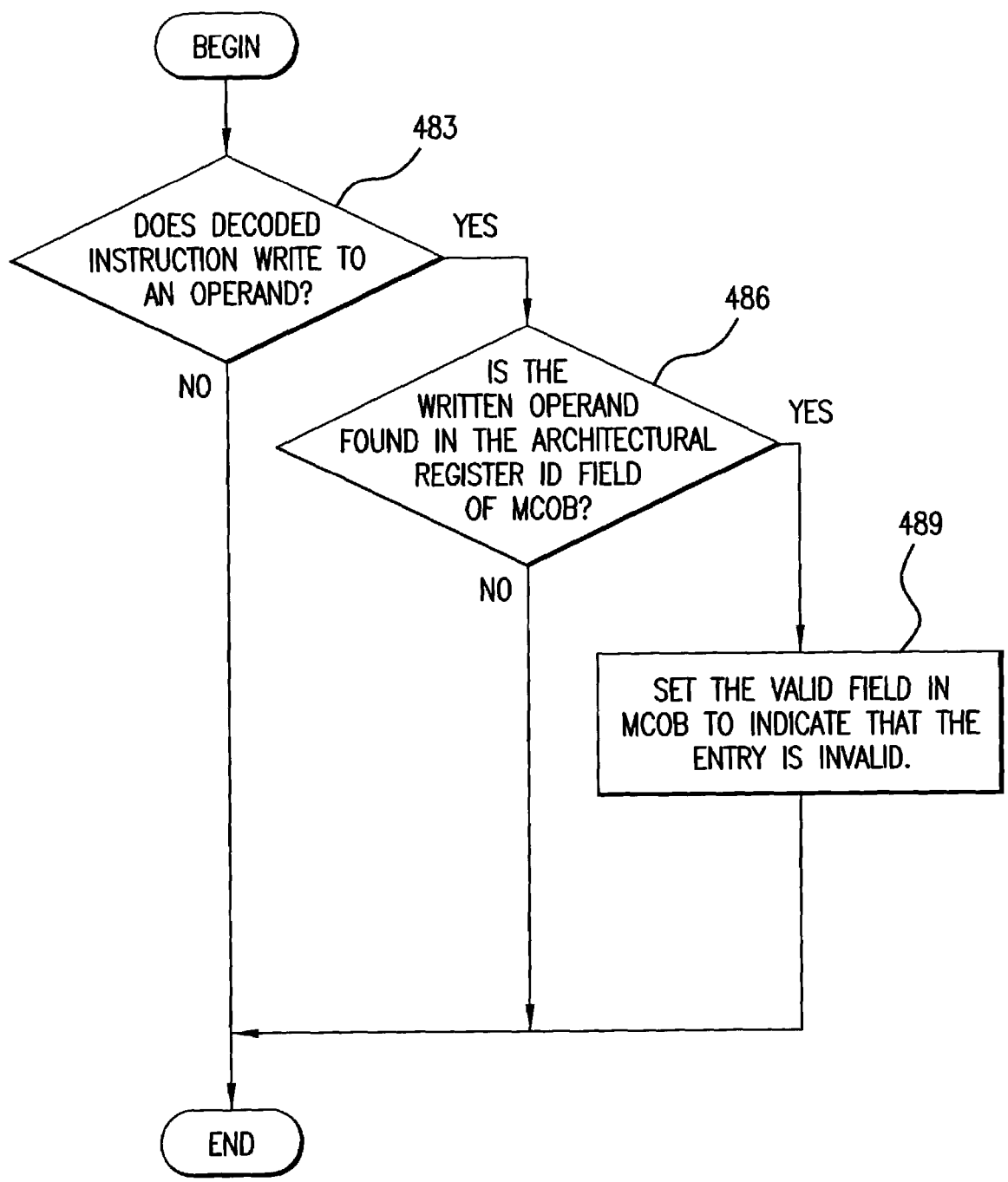
FIG. 4b is a flowchart illustrating the steps required in order to disable data dependency collapsing based on control-flow speculation in a second embodiment of the present invention using a physical register reuse scheme.

FIG. 4b is a flowchart illustrating the steps required in order to disable data dependency collapsing based on control-flow speculation in the second embodiment of the present invention using a physical register reuse-scheme. FIG. 4b further elaborates on steps 250 and 255 of FIG. 2. In step 483, modified register renamer 140 determines if the decoded instruction writes to an operand. If the decoded instruction does not write to any of its operands, then the entry in MCOB 155 remains valid. If the decoded instruction writes to one of its operands then in step 486, modified register renamer 140 determines if the operand which is written into by the decoded instruction is found in the architectural register id. field of MCOB 155. If the decoded instruction does not write to this field, then the entry in MCOB 155 remains valid. If the decoded instruction does write to this field, then in step 489, the valid field in MCOB 155 is set to indicate that the entry is no longer valid (i.e., the valid field is set to "0").

Although embodiments are specifically illustrated and described herein, it will be appreciated that modifications and variations of the present invention are covered by the above teachings and within the purview of the appended claims without departing from the spirit and intended scope of the invention.

What is claimed is:

1. An apparatus, comprising:
   a branch prediction unit to provide a prediction as to whether a branch is to be taken for a first instruction associated with a set of operands; and
   a post-decode unit to record information on said set of operands for the first instruction and perform data dependency collapsing for operands of instructions to be executed subsequent to said first instruction based on said prediction.

2. The apparatus of claim 1 wherein the post-decode unit is to disable said data dependency collapsing if said prediction is incorrect.

3. The apparatus of claim 2 wherein the recorded information is to be stored in a compare operand buffer and said recorded information includes a set of operands and a valid field to indicate whether the set of operands is valid.

4. The apparatus of claim 3 wherein the set of operands includes a register number field referring to an architectural register for one of the set of operands and an immediate value/register number field referring to at least one of the architectural register of another of the set of operands and an immediate value.

5. The apparatus of claim 4 wherein the recorded information includes a register/immediate field to indicate whether the immediate value/register number field includes the architectural register identifier for the other of the set of operands or the immediate value.

6. The apparatus of claim 5 wherein said post-decode unit is to copy the recorded information to a register translation table, said register translation table including a set of entries and each of said entries includes one of the set of operands for the first instruction that is indexed using the other of the set of operands, a valid field indicating whether the particular one of the set entries in said register translation table is valid; and a register/immediate field to indicate whether the particular one of the set of operands is an immediate value or an architectural register for the particular one of the set of operands.

7. The apparatus of claim 6 wherein the one of the set of operands used for indexing is a predicted latest defined operand.

8. An apparatus, comprising:
   a branch prediction unit that is to provide a prediction as to whether a branch is to be taken for a first instruction associated with a set of operands; and
   a modified register renamer that is to record information on said set of operands for the first instruction and remap an architectural register for one of the set of operands to a physical register for another of the set of operands based on said prediction.

9. The apparatus of claim 8 wherein the modified register renamer is to invalidate said recorded information if a decoded instruction is to write to one of the set of operands.

10. The apparatus of claim 9 wherein the recorded information is to be stored in a modified compare operand buffer and each entry includes a set of operands and a valid field to indicate whether the entry is valid.

11. The apparatus of claim 10 wherein the set of operands for each entry includes an architectural register identification field and a physical register identification field.

12. The apparatus of claim 11 wherein the architectural register for one of the set of operands is the architectural register for a predicted latest defined operand and the physical register for one of the set of operands is the physical register for a predicted earliest defined operand.

13. A method for collapsing a set of operands, comprising:
predicting whether a branch of a first instruction is to be taken upon execution based on a set of operands associated with said first instruction;
recording information on said set of operands; and
collapsing operands that depend from the set of operands for instructions to be executed subsequent to said first instruction based on said predicting operation.

14. The method of claim 13 further comprising:
disabling said collapsing operation for said set of operands if said predicting operation mispredicts whether a branch of the first instruction is to be taken.

15. The method of claim 14 wherein the recorded information is recorded in a first entry, the method further comprising:
copying the recorded information to one of a set of second entries in a register translation table, each entry including a valid field indicating whether the particular one of the set of second entries is valid; an immediate value/register number field including at least one of the immediate value and an architectural register for one of the set of operands; and a register/immediate field indicating whether the immediate value/register number field contains the architectural register for one of the set of operands or the immediate value.

16. The method of claim 15 further comprising:
storing a first operand of the first instruction in the register number field of the first entry, a second operand of the first instruction in the immediate value/register number field of the compare operand buffer;
setting the register/immediate field of the first entry to a "1" value if the immediate value/register number field contains a register number and a "0" value if the immediate value/register number field contains an immediate value; and
setting the valid field of the first entry to a valid state.

17. The method of claim 16 further comprising:
finding for the first entry, a replacement operand that is at least one of an immediate value and a predicted earliest defined operand, and a former operand that is a predicted latest defined operand.

18. The method of claim 17 further comprising:
modifying the set of second entries such that one of the set of second entries is a new entry, the new entry being indexed in the set of second entries by the former operand;
copying the replacement operand from the first entry to the immediate value/register number field of the new entry;
setting the valid field of the new entry to a valid state, and if the immediate value/register number field for the new entry contains an immediate value, then setting the register/immediate field to a "0" value, otherwise, setting the register/immediate field to a "1" value.

19. The method of claim 18 further comprising:
determining whether an operand associated with a second instruction indexes one of the set of second entries and the corresponding one of the set of second entries has the valid field set to valid; and
replacing the particular one of the set of operands with the contents of the immediate value/register number field of the corresponding one of the set of second entries.

20. The method of claim 19, further comprising:
determining whether a third instruction, when executed, is to write to one of its operands that is found in at least one of the register number field and the immediate value/register number field of the first entry; and
disabling data collapsing for that particular one of the set of operands by setting the valid field in the first entry to invalid.

21. The method of claim 20, further comprising:
determining whether a fourth instruction, when executed, is to write to one of its operands that indexes one of the set of second entries; and
disabling data collapsing for that particular one of the set of operands by setting the valid field to invalid for the corresponding one of the set of second entries.

22. The method of claim 21, further comprising:
determining whether a fifth instruction, when executed, is to write to one of its operands and that particular one of the set of operands is found in the immediate value/register number field of one of the set of second entries; and
disabling data collapsing for that particular one of the set of operands by setting the valid field of the corresponding one of the set of second entries to an invalid state.

23. A method for collapsing a set of operands, comprising:
predicting whether a branch of a first instruction is to be taken upon execution based on a set of operands associated with said first instruction;
recording information on said set of operands; and
remapping an architectural register for one of the set of operands to a physical register for another of the set of operands based on said predicting operation and whether the recorded information is valid.

24. The method of claim 23 wherein said recording operation includes creating a modified compare operand buffer which includes a plurality of entries, each entry including a valid field indicating whether the entry is valid, an architectural register identification field including an architectural register for one of the set of operands, and a physical register identification field including one of a set of physical registers for another of the set of operands.

25. The method of claim 24 further comprising:
determining whether a second instruction references an immediate value;
determining whether the immediate value is stored in one of the set of physical registers;
storing that particular one of the set of physical registers for the immediate value in the physical register identification field of the entry;
storing the architectural register for another one of the set of operands in the architectural register identification field of the entry; and
setting the valid field of the entry to a valid state.

26. The method of claim 25, further comprising:
determining whether any of the set of operands of a third instruction is an immediate value;
storing an architectural register in the architectural register identification field for a predicted latest defined operand;
storing one of the set of physical registers in the physical register identification field for a predicted earliest defined operand; and
setting and the valid field of the entry to a valid state.

27. The method of claim 26 further comprising:
remapping the architectural register in the architectural register identification field of the entry to the particular one of the set of physical registers in the physical register identification field of the entry.

* * * * *